Feb. 9, 1943.    R. M. POTTER    2,310,459
FLUID PROPORTIONING DEVICE
Filed Oct. 12, 1940    3 Sheets-Sheet 1
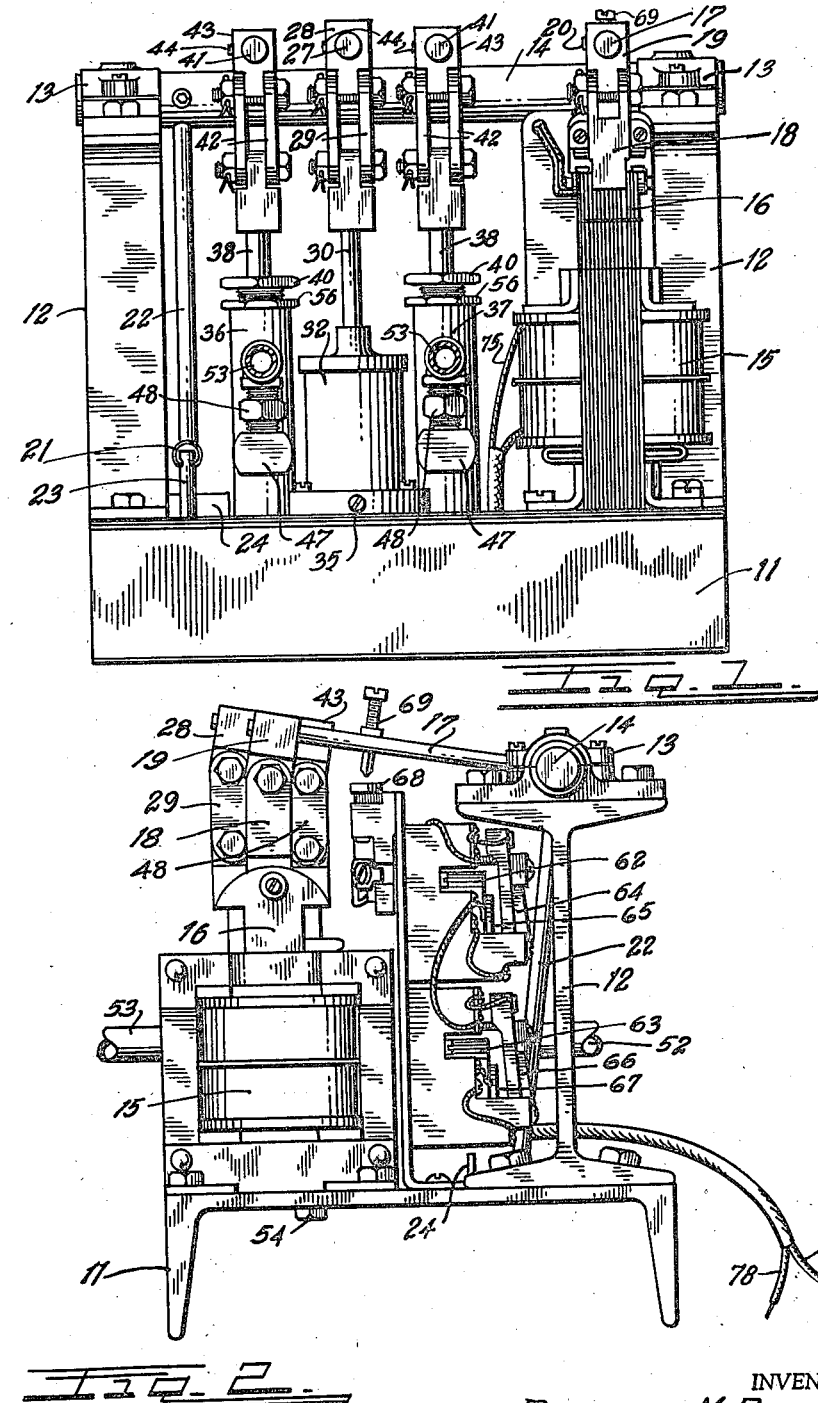
INVENTOR.
RAYMOND M. POTTER
BY

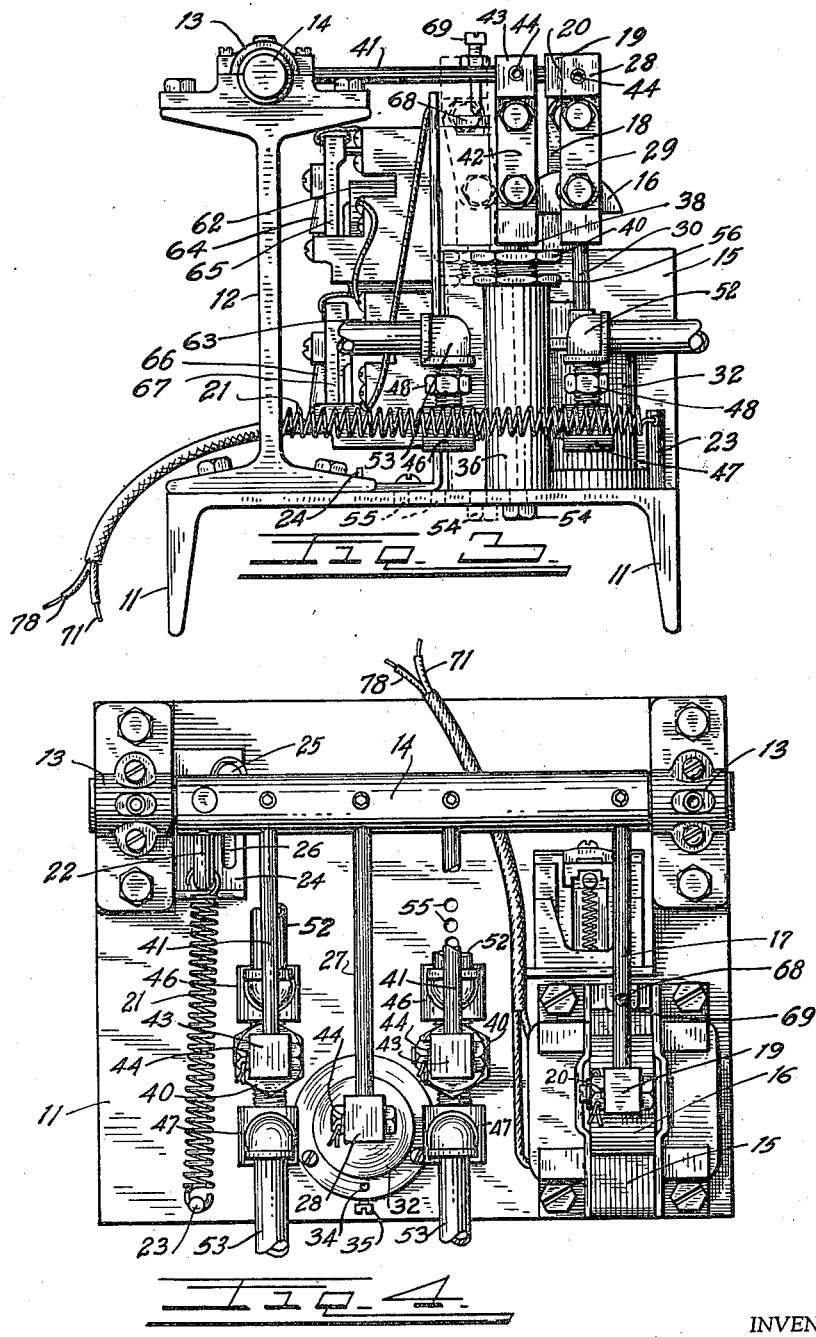

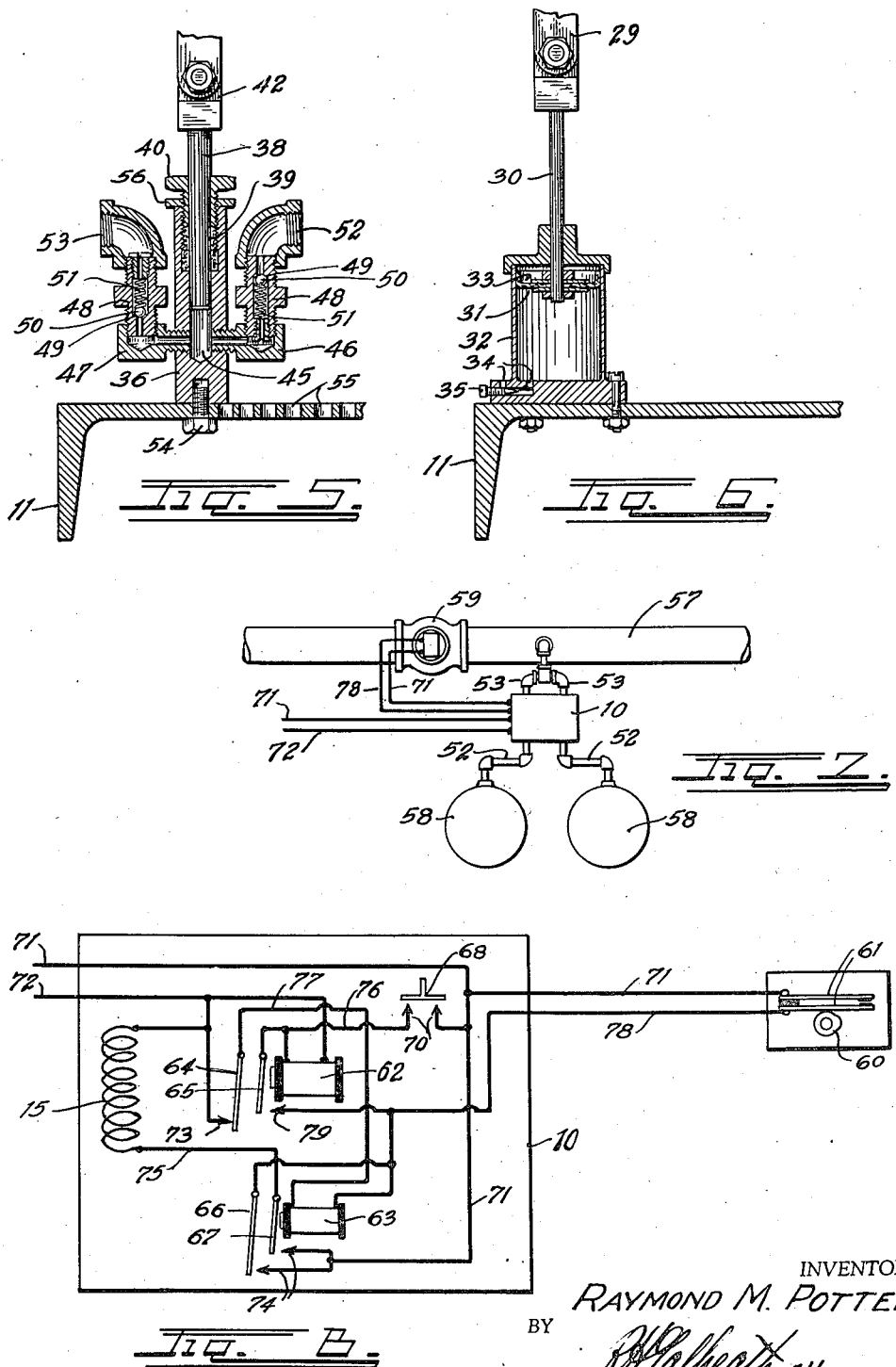

Patented Feb. 9, 1943

2,310,459

UNITED STATES PATENT OFFICE 2,310,459

FLUID PROPORTIONING DEVICE

Raymond M. Potter, Denver, Colo., assignor to Western Filter Co., Denver, Colo.

Application October 12, 1940, Serial No. 360,894

9 Claims. (Cl. 210—40)

This invention relates to a fluid proportioning device and is more particularly designed for placing treatment solutions into water mains for treatment of the water flowing therethrough.

The principal object of the invention is to provide an automatic device which will accurately and continuuously proportion the reagents and chemicals in accordance with the amount of water flowing through a main or conduit and which can be accurately adjusted.

Another object of the invention is to provide a device of this character which can handle a plurality of different chemical solutions and in which the proportioning of each different solution can be independently adjusted without effecting the proportioning of the remaining solutions; and to provide a machine which will operate purely automatically without requiring attention.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a front view of the improved fluid proportioning device;

Fig. 2 is a side view thereof;

Fig. 3 is a similar view of the opposite side;

Fig. 4 is a plan view thereof;

Fig. 5 is an enlarged detail section through one of the fluid pumps;

Fig. 6 is a similar enlarged section through the retarding dash pot;

Fig. 7 is a diagrammatic view illustrating the installation of this invention on a water main; and Fig. 8 is a circuit diagram illustrating the various electrical circuits employed in the device.

In actual practice the entire mechanism is covered by means of a water-proof housing, which is designated by the numeral 10 in Fig. 7. The housing has been omitted from the remaining views of the drawings for purpose of illustration of the interior mechanism.

The improved proportioning device is mounted on a suitable base member 11 from which two bearing pedestals 12 arise. The pedestals support shaft bearings 13 in which each extremity of an operating shaft 14 is journalled.

The operating shaft is reciprocated at predetermined intervals by means of an electrical solenoid 15 designed to attract an armature plunger 16. The plunger is hingedly connected to an operating rod 17 by means of a link member 18 which is hingedly secured to an adjustable block 19 on the operating rod 17. The position of the block 19 on the operating rod 17 can be varied to regulate the length of the delivered stroke of the armature. The block can be set in any desired position on the rod by means of a set screw 20.

It can be readily seen that whenever the solenoid 15 is energized, the armature will be attracted to create an arcuate reciprocation of the shaft 14. When the solenoid is de-energized, the shaft is returned to its former position by means of a tension spring 21 which is stretched between a spring arm 22 on the shaft 14 and a spring post 23 on the base 11.

The length of the return movement of the shaft 14 is regulated and limited by means of a stop clip 24 having an up-turned extremity against which the lower extremity of the spring arm 22 contacts. The clip 24 is clamped to the base 11 by means of a clamp screw 25 which passes through a slotted opening 26 in the clip to allow adjustment of the position of the latter.

If the spring were allowed to instantly snap the shaft back to its former position there might not be sufficient time for the various relays, to be later explained, to operate. Also a too quick return might result in drawing air into the pumps, interference with the check valves, and damage to the various operating parts. Therefore, a retarding arm 27 is extended from the shaft and connected, through the medium of an attachment block 28 and connecting links 29, with a plunger rod 30. The plunger rod 30 is connected with a piston 31 operating within a dash pot 32. The piston is provided with a cup washer 33 which acts under the influence of the spring 21 to create a partial vacuum in the bottom of the dash pot as the plunger rises. Air is admitted to break this vacuum through an air passage 34 controlled by means of a needle valve 35. Thus, by the setting of the needle valve 35, the speed of the upward movement of the plunger can be easily regulated and controlled as desired.

The device as illustrated is designed for pumping two different reagent solutions in two independent pump cylinders 36 and 37. The pump cylinders and their operating mechanism are identical and to accommodate additional solutions additional identical pump cylinders may be added to the device.

The pumping in each cylinder is accomplished by means of a pump rod 38 sealed in the upper end of the cylinder by means of suitable packing 39 and packing nut 40. The latter nut can be locked in any desired position by means of a suitable lock nut 56. The pump rods are each operated from a pump lever 41 extending from the shaft 14. The rod 38 is connected to its lever by means of suitable connecting links 42 and a link block 43. The link blocks 43 can be moved to any desired position along their levers 41 and can be set in any desired position thereon by means of suitable set screws 44.

The lower extremity of each pump plunger snugly and slidably enters a pump chamber 45 in the pump cylinders so as to displace fluid therefrom. The fluid enters through an intake elbow 46 and discharges through a discharge elbow 47. Check valve fittings 48 are threaded into the elbows 46 and 47. Each fitting contains a valve seat 49, a valve ball 50 and a valve spring 51. The two check valve fittings are positioned in opposite directions so that fluid may pass the first valve and flow into the elbow 46 but cannot return therethrough, and so that fluid may discharge from the elbow 47 but cannot return thereto. Each intake check valve is connected with a fluid supply line 52 and the discharge elbows 47 are connected with a discharge pipe 53.

The construction of all the pump cylinders is similar. Each pump cylinder is secured to the base member 11 by means of a cap screw 54. A plurality of aligned openings 55 are provided in the base member for the cap screws to enable each pump cylinder to be placed at any desired position along its pump lever 41 depending upon the length of the stroke desired. Thus, it can be seen that at each energization of the solenoid 15 all pump cylinders will deliver a charge of fluid to the pipe 53 depending upon the length of their respective strokes.

In use, the discharge pipe feeds into a water main 57, see diagram of Fig. 7, and the two supply lines 52 are connected to two reagent tanks 58 respectively, which supply the particular reagent solutions desired.

A water meter device 59 is installed in the main 57 to be operated by the flow of the water through the latter. The meter device 59 may be of any of the standard designs for indicating the amount of water which has passed through the main in any given time. For this use, however, one of the meter hand shafts of the standard meter is provided with a suitable cam, as indicated diagrammatically in Fig. 8 at 60. The cam acts to close a circuit between two cam contact blades 61 at each revolution of the particular meter shaft upon which it is installed. It is the closing of this circuit which operates the solenoid at intervals proportionate to the amount of water flowing through the main 57.

It has been found, however, that it is not practical to connect the contacts 61 directly in circuit with the solenoid 15 for the reason that these contacts may be held closed for a considerable period if the flow of the water is low. They would therefore continue to energize the solenoid for considerable periods. On the other hand, this contact might be so brief that it would not cause a complete pump cycle in the device. For these reasons, two relay electro-magnets 62 and 63 are employed in the solenoid circuit. The magnet 62 acts to actuate two switch blades 64 and 65, respectively, while the magnet 63 similarly acts to actuate two switch blades 66 and 67, respectively.

A circuit closer 68 is also employed and is positioned in the path of the operating rod 17. This rod is provided with an adjustable contact screw 69 which contacts the circuit closer 68 at each downward movement of the solenoid plunger to cause the latter to close a circuit between two contacts 70. The time of closing the latter can be regulated by the setting of the contact screw 69. The circuit closer 68 may be any of the usual "push button" type switches which can be purchased on the open market and needs no detailed description here.

Current is supplied to the device from any available electric feeds 71 and 72. The feed 72 leads to the solenoid 15, to the relay magnet 62, and to a contact 73 positioned in the opening path of the blade 64. The other feed 71 leads to one of the cam contact blades 61, to one of the limit switch contacts 70, and to relay contacts 74 in the closing path of the blades 66 and 67. The remaining lead to the solenoid 15 is connected with the blade 67 by means of a conductor 75.

A conductor 76 leads from the other limit switch contact 70 to the magnet 62 and to the blade 65. A conductor 77 leads from the blade 64 to the relay magnet 63. A conductor 78 leads from the other cam switch blade 61 to the relay magnet 63, the relay blade 66, and to a contact 79 in the closing path of the blade 65.

The operation of this circuit is as follows:

Let us assume that the water meter device 59 has rotated the cam 60 to close the blades 61. Current now flows from the feed 71 to the conductor 78, through the relay magnet 63, thence through the conductor 77, the blade 64, and the contact 73, to the other feed 72. This energizes the magnet 63 causing it to attract its blades 66 and 67 to close the contacts 74. Current now flows from the feed 71 through the blade 67, conductor 75, to the solenoid 15, thence to the feed 72. This energizes the solenoid 15 causing it to operate all pumps connected therewith to force a charge of mixed reagent fluid into the water main 57.

As the solenoid plunger 16 approaches the end of its stroke, the contact screw 69 will contact the circuit closer 68 closing the contacts 70. Current now flows through the conductor 76 to the relay magnet 62, thence to the feed 72 causing the latter magnet to attract its blades 64 and 65 so as to break the contact 73 and close the contact 79. The breaking of the contact 73 de-energizes the conductor 77 and the magnet 63 causing the latter to release its blades and open the contacts 74. This immediately de-energizes the solenoid by the open circuit at the blade 67 and allows the spring 21 to return the pump plungers 38 under the retarding control of the dash pot 32. This immediately allows the circuit closer 68 to open the contacts 70.

The relay magnet 62 remains energized, however, to maintain the contact 73 open since current is flowing through the cam switch blade 61, conductor 78, contact 79, blade 65 to the magnet 62, thence to the feed 72. The device cannot, therefore, again operate until contact is broken by the rotation of the cam 60 to open the blades 61 and restore the relays to their original position. Therefore, regardless of how long the contact blade 61 may remain in contact, the device will operate for only one single stroke at each circuit closing.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A device for delivering a liquid reagent to flowing water in proportion to the amount of flow thereof comprising: a water conduit through which said water flows; a rotatable shaft; an operating lever projecting from said shaft; a pump lever projecting from said shaft; a solenoid; an armature actuated by said solenoid; connecting means between said armature and said operating lever so that movement of the former will turn the shaft in one direction; spring means urging said shaft in the other direction; a pump cylinder; a pump plunger in said cylinder; means connecting the pump piston with the pump lever; means for supplying liquid reagent to said pump cylinder; a discharge conduit from said pump to said water conduit; and means for energizing said solenoid in consequence of the flow of water through said water conduit.

2. A device for delivering a liquid reagent to flowing water in proportion to the amount of flow thereof comprising: a water conduit through which said water flows; a rotatable shaft; an operating lever projecting from said shaft; a pump lever projecting from said shaft; a solenoid; an armature actuated by said solenoid; connecting means between said armature and said operating lever so that emerging said solenoid will impart a forward movement to said shaft; a pump cylinder; a pump plunger in said cylinder; means connecting the pump piston with the pump lever; means for supplying liquid reagent to said pump cylinder; a discharge conduit from said pump to said water conduit; a retarding arm projecting from said shaft; a dash pot; a piston in said dash pot; means connecting said piston with said retarding arm so that the former will resist return movement of said shaft; spring means for imparting return movement to said shaft; and means for energizing said solenoid in consequence of the flow of water through said water conduit.

3. A device for delivering a treatment solution to water in proportion to the amount of flow thereof comprising: a water conduit; a solenoid; a pump shaft; a plunger positioned in the magnetic field of said solenoid; a lever projecting from said shaft; a connecting member between said plunger and said lever for rotating said shaft in one direction; spring means for rotating said shaft in the other direction; a pump arm extending from said shaft; a solution tank; a pump operable by said pump arm; an intake conduit for said pump communicating with said solution tank; a discharge conduit from said pump communicating with said water conduit; and means for energizing said solenoid in consequence of the flow of water through said water conduit.

4. A device for delivering a treatment solution to water in proportion to the amount of flow thereof comprising: a water conduit; a solenoid; a pump shaft; a plunger positioned in the magnetic field of said solenoid; a lever projecting from said shaft; a member connecting said plunger with said lever so that the former will rotate said shaft in one direction; spring means urging said shaft in the other direction; a pump arm extending from said shaft; a solution tank; a pump operable by said pump arm; an intake conduit for said pump communicating with said solution tank; a discharge conduit from said pump communicating with said water conduit; a flow actuated device in said water conduit; a circuit closer operated by said device; and an electrical circuit including said solenoid and said circuit closer for energizing the former.

5. A device for delivering a treatment solution to water in proportion to the amount of flow thereof comprising a water conduit; a solenoid; a pump shaft; a plunger positioned in the magnetic field of said solenoid; a lever projecting from said shaft; means connecting said plunger with said lever so that movements of the former will impart a reciprocal rotation to the shaft; a pump arm extending from said shaft; a solution tank; a pump operable by said pump arm; an intake conduit for said pump communicating with said solution tank; a discharge conduit from said pump communicating with said water conduit; means for energizing said solenoid in consequence of the flow of water through said water conduit; and spring means for returning said shaft after each stroke.

6. A device for delivering a treatment solution to water in proportion to the amount of flow thereof comprising a water conduit; a solenoid; a pump shaft; a plunger positioned in the magnetic field of said solenoid; a lever projecting from said shaft; means connecting said plunger with said lever so that movements of the former will impart a reciprocal rotation to the shaft; a pump arm extending from said shaft; a solution tank; a pump operable by said pump arm; an intake conduit for said pump communicating with said solution tank; a discharge conduit from said pump communicating with said water conduit; means for energizing said solenoid in consequence of the flow of water through said water conduit; spring means for returning said shaft after each stroke; and means for retarding the returning movement of said shaft.

7. A device for delivering a treatment solution to water in proportion to the amount of flow thereof comprising a water conduit; a solenoid; a pump shaft; a plunger positioned in the magnetic field of said solenoid; a lever projecting from said shaft; means connecting said plunger with said lever so that movements of the former will impart a reciprocal rotation to the shaft; a pump arm extending from said shaft; a solution tank; a pump operable by said pump arm; an intake conduit for said pump communicating with said solution tank; a discharge conduit from said pump communicating with said water conduit; means for energizing said solenoid in consequence of the flow of water through said water conduit; spring means for returning said shaft after each stroke; and a limit switch operable in consequence of the rotation of said shaft for de-energizing said solenoid at the termination of the pump stroke.

8. A device for delivering a treatment solution to water in proportion to the amount of flow thereof comprising a water conduit; a solenoid; a pump shaft; a plunger positioned in the magnetic field of said solenoid; a lever projecting from said shaft; means connecting said plunger with said lever so that movements of the former will impart a reciprocal rotation to the shaft; a pump arm extending from said shaft; a solution tank; a pump operable by said pump arm;

an intake conduit for said pump communicating with said solution tank; a discharge conduit from said pump communicating with said water conduit; means for energizing said solenoid in consequence of the flow of water through said water conduit; spring means for returning said shaft after each stroke; a retarding arm extending from said shaft; a dash pot; and a plunger in said dash pot connected with said retarding arm for retarding the return stroke of said shaft.

9. A device for delivering a treatment solution to water in proportion to the amount of flow thereof comprising a water conduit; a solenoid; a pump shaft; a plunger positioned to be attracted by said solenoid; a lever projecting from said shaft; means connecting said plunger with said lever so that movements of the former will impart a reciprocal rotation to the shaft; spring means for returning said shaft after each rotation thereof; a pump arm extending from said shaft; a shiftable member on said pump arm; a pump cylinder adjacent said member; a pump plunger in said cylinder; links connecting said plunger with said shiftable member so that the movements of said arm will be communicated to said plunger; means for varying the position of said pump cylinder and shiftable member along said arm to vary the stroke of said pump; a tubular member for conveying the discharge of said pump to said water conduit; a conduit for supplying treatment solution to said pump; and means for energizing the solenoid in consequence of the flow of water through said conduit.

RAYMOND M. POTTER.